(12) United States Patent
Yamanaka et al.

(10) Patent No.: US 6,169,719 B1
(45) Date of Patent: Jan. 2, 2001

(54) CAR-MOUNTED DISC/TAPE PLAYER

(75) Inventors: Takashi Yamanaka, Tokyo; Shozo Nishimura, Machida, both of (JP)

(73) Assignee: Tenashin Denki Co., Ltd., Tokyo (JP)

( * ) Notice: Under 35 U.S.C. 154(b), the term of this patent shall be extended for 0 days.

(21) Appl. No.: 09/299,091

(22) Filed: Apr. 26, 1999

(30) Foreign Application Priority Data

Apr. 27, 1998 (JP) .................................................. 10-117167

(51) Int. Cl.$^7$ .................................................. G11B 33/02
(52) U.S. Cl. .......................................................... 369/75.1
(58) Field of Search .................................... 369/178, 191, 369/192, 77.1, 77.2, 75.1, 75.2, 36, 34; 360/99.02, 99.06, 92

(56) References Cited

U.S. PATENT DOCUMENTS 5,859,828 * 1/1999 Ishibashi ............................ 369/77.1

FOREIGN PATENT DOCUMENTS 2833253   2/1998  (JP) .

* cited by examiner

*Primary Examiner*—Allen T. Cao
(74) *Attorney, Agent, or Firm*—Dickinson Wright PLLC

(57) ABSTRACT

In a car-mounted disc/tape player, in which a disc player and a tape player are assembled in a substantially rectangular cabinet capable of being accommodated in a predetermined accommodation space in a car, it is sought to reduce the player size so as to be above to conform to the DIN Standard. A disc insertion slot is disposed above and leftwardly of a cassette insertion slot. A disc drive motor is disposed forwardly of a tape drive motor. The bottom surface of the disc drive motor is set to be at a level below the top surface of the tape drive motor. A zone of movement of a pick-up is defined in a space between the disc drive motor and the left front corner of the cabinet.

5 Claims, 10 Drawing Sheets

CAR-MOUNTED DISC/TAPE PLAYER

BACKGROUND OF THE INVENTION

1. Field of the Invention

This invention relates to a car-mounted disc/tape player, which comprises a disc player for playing back data recorded on a disc having a diameter of, for instance, 12 centimeters and a tape player for playing back data recorded on a tape in a compact tape cassette, the disc and tape players being assembled in a substantially rectangular cabinet which can be accommodated in a predetermined mounting space in a car.

The mounting space is generally prescribed by DIN Standard(Deutsche Industrie Norm) No. 75 500 to be 180 millimeters in width, 52 millimeters in height and 170 millimeters in depth.

2. Description of the Prior Art

As the car-mounted disc/tape player comprising disc player for playing back data recorded on a disc having a diameter of, for instance, 12 centimeters and a tape player for playing back data recorded on a tape in a compact tape cassette, a large size one called double DIN Standard is well known in the art, which has a height of 105 millimeters, i.e., double the height prescribed by the above DIN Standard, which is also called as "single" DIN standard in comparison with the above "double" DIN Standard.

However, the disc player includes a pick-up for playing back data recorded on the disc and a disc drive motor for rotating the disc, while the tape player includes a tape drive motor for playing back data recorded on the tape in the tape cassette. Therefore, size reduction such as to conform to the above single DIN Standard (hereinafter referred simply as "DIN Standard") is not obtainable by merely displaying the disc and tape players one above another or in a planar fashion.

This is so because in the case of disposing the two players one above another, the height size can not be made less than the sum of the height sizes of the individual players. Also, in the case of disposing the two players in a planar fashion, the planar dimensions can not be made less than the sums of the planar dimensions of the individual players.

Japanese Patent No. 2833253 discloses such a prior art car-mounted disc/tape player. This player has the above problems.

The invention was made in order to solve the above problem, and it concerns a car-mounted disc/tape player, in which a disc player including a pick-up and a disc drive motor is assembled with a tape player in a substantially rectangular cabinet, which can be accommodated in a predetermined accommodation space in a car and has a disc insertion slot and a cassette insertion slot provided in its front operating board.

The tape drive motor has a greater axial dimension than the disc drive motor. The disc is inserted with its recording surface down through the disc insertion slot into the disc player. The compact tape cassette is inserted with the tape surface directed to the right, viewing toward the front operating board, through the cassette insertion slot into the tape player.

It is an object of the invention to reduce such a car-mounted disc/tape player both in the planar dimensions and the height such as to be conformed to the DIN Standard.

SUMMARY OF THE INVENTION

One feature of the invention resides in a car-mounted disc/tape player, which comprises a disc player including a pick-up and a disc drive motor and a tape player including a tape drive motor having a greater axial dimension than the disc drive motor, the two players being assembled in a substantially rectangular cabinet, which can be accommodated in a predetermined accommodation space in a car and has a disc insertion slot for inserting a disc with the recording surface thereof down into the disc player and a front operating board having a cassette insertion slot for inserting a compact tape cassette with the tape surface thereof directed to the right, viewing toward the operating board, into the tape player, wherein the disc insertion slot and the tape insertion slot are disposed one above another with the center of the disc insertion slot in the width thereof located on the left side of the center of the cassette insertion slot in the width thereof, viewing toward the operating board, and the disc insertion slot at an upper position, the disc drive motor is disposed ahead of the tape drive motor and with the bottom surface at a position beneath the top surface of the tape drive motor, and the line connecting the disc insertion slot width center and the disc drive motor center coincides with the direction of the disc insertion.

With the disc insertion slot and the tape insertion slot disposed such that they are transversely shifted from one another in the above way, the bottom surface of the disc drive motor can be located beneath the top surface of the tape drive motor, thus permitting the overall player height to be made less than the sum of the height sizes of the disc and tape players.

Also, since the compact tape cassette accommodation space can be disposed beneath the disc accommodation space, the overall planer dimensions can be made less than the sum of the planar dimensions of the two players.

Furthermore, by setting the disc drive motor top surface and the tape drive motor top surface to be at the same level, the overall player height can be reduced by an extent corresponding to the height dimension of the disc drive motor.

Still further, by setting the cassette insertion slot to be at a position between the height positions of the top and bottom surfaces of the tape drive motor, the height size of the cassette accommodation space can be accommodated by the height size of the tape drive motor, thus permitting the overall player height by an extent corresponding to the height size of the cassette accommodation space.

Yet further, by disposing a disc loading mechanism in a space, which is defined in the cabinet above the tape player and on the right side of the disc player, and disposing circuit components in a rear space in the cabinet, the cabinet space can be effectively utilized, and it is thus possible to promote the overall player size reduction.

Moreover, according to the invention a pick-up movement zone for the pick-up is set in a left corner portion, viewing toward the operating board, which zone is defined between the disc drive motor and the left side front corner of the cabinet and close to the disc insertion slot. Also, a drive portion including a motor for driving the pick-up is disposed in this zone. Thus, the effective utilization of the cabinet space can be further promoted to further promote the size reduction.

BRIEF DESCRIPTION OF THE DRAWINGS

These and other objects, features and advantages of the invention will become more apparent upon reading of the following detailed description and drawings, in which.

DETAILED DESCRIPTION OF THE PREFERRED EMBODIMENTS

Figure 1:
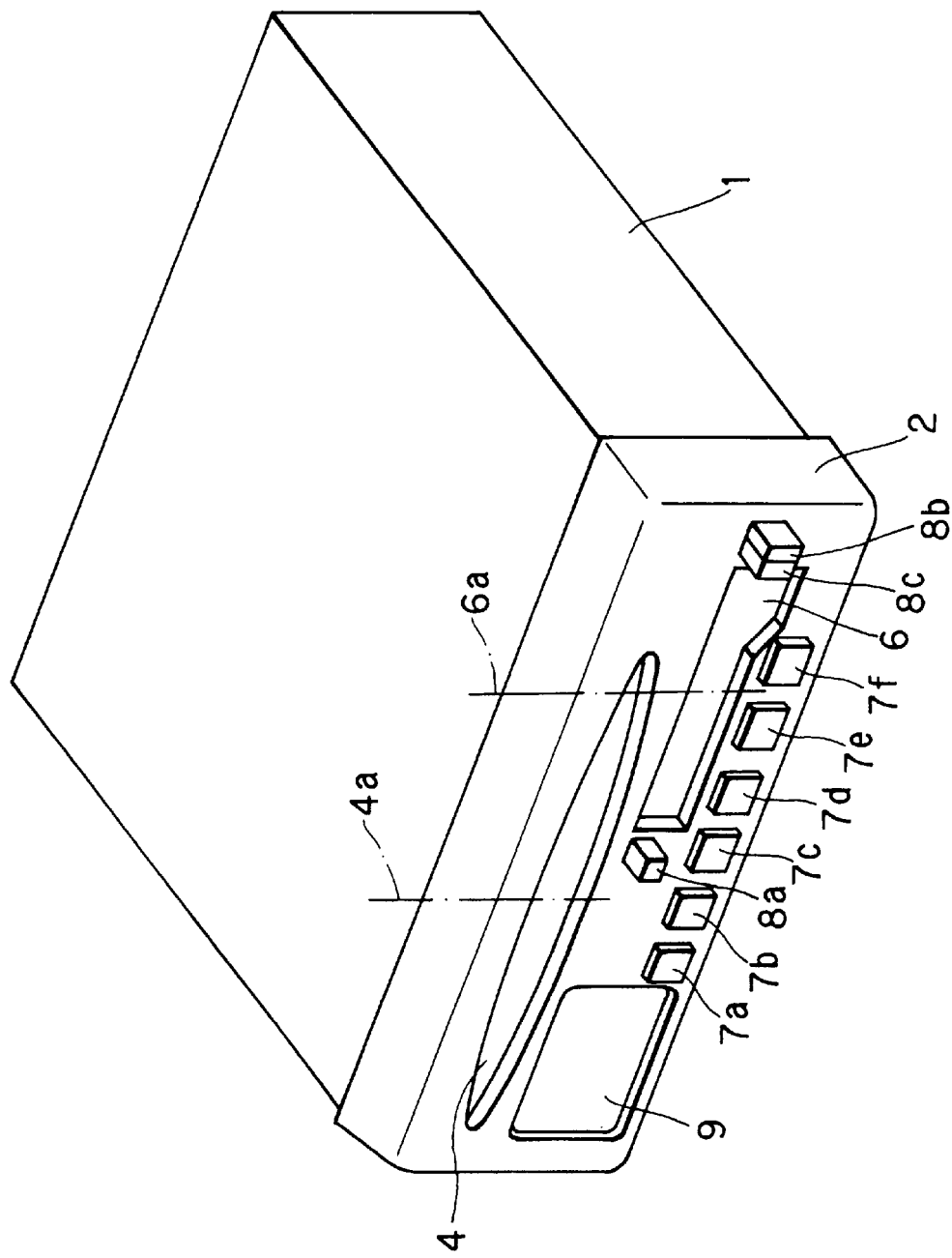
FIG. 1 is a perspective view showing a first embodiment of the car-mounted disc/tape player according to the invention.
Figure 4:
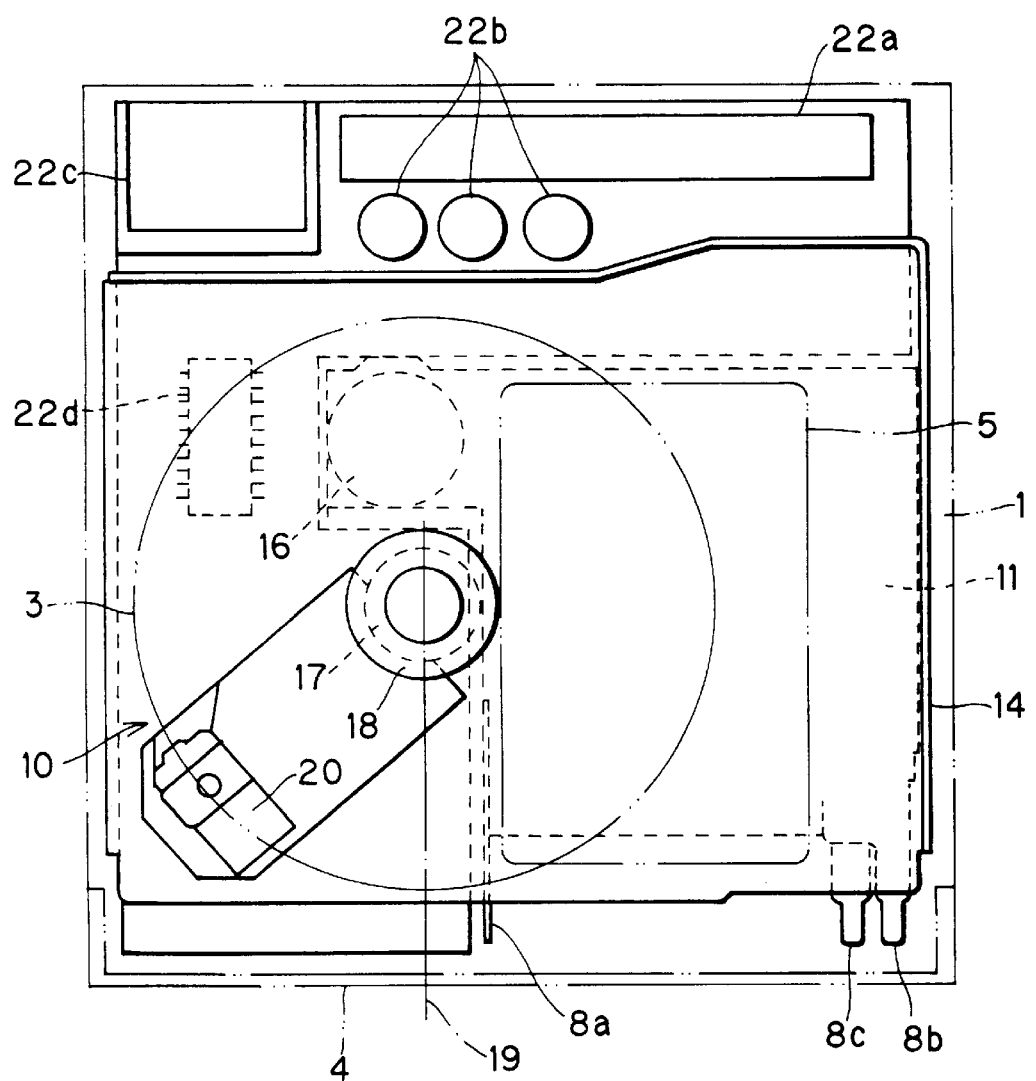
FIG. 4 is a plan view showing the same embodiment with the cabinet removed.

FIG. 1 is a perspective view showing a first embodiment of the disc/tape player according to the invention. In the Figure, reference numeral 1 designates a substantially rectangular cabinet, which has dimensions and a shape such that it can be accommodated in a predetermined accommodation space (or mounting space, not shown) in a car. The cabinet 1 has a front operating board or panel 2, which has a disc insertion slot 4 for inserting a 12-centimeter disc 3 (see FIG. 4) and a cassette insertion slot 6 for inserting a compact tape cassette 5 (FIG. 4).

In the following description, the cabinet 1 is defined such that the operating board 2 is the front side and the opposite side is the rear side. That is, in FIG. 1, the longitudinal direction of the cabinet 1 is defined to be from the operating board 2 as the front side to the rear side. The "left side" and "right side" of the operating board 2 are referred to as such as it is seen in FIG. 1. That is, the width direction of the operating board 2 is the width direction or transversal direction of the cabinet 1. Also, in FIG. 1 the cabinet 1 is seen such that it is placed vertically, and its vertical direction coincides with this direction.

In the following description and also in claims, the upper and lower, left and right and front and rear sides are referred to as such in view of the cabinet 1 and the operating board 2 as seen in FIG. 1.

The disc insertion slot 4 and the cassette insertion slot 6 are disposed one above another with the disc insertion slot 4 at an upper position. The disc insertion slot 4 in the operating board 2 is also disposed such that its center (disc insertion slot width center) 4a in the width direction is located on the left side of a center (cassette insertion slot width center) 6a of the cassette insertion slot 6. A disc 3 can be inserted with its recording surface down into the disc insertion slot 4. A compact tape cassette 5 can be inserted with its inner tape surface directed to the right side of the operating board 2 viewing toward the operating board 2, into the cassette insertion slot 6.

The direction of insertion of the disc 3 and the compact tape cassette 5 coincides with the longitudinal direction of the cabinet 1.

The operating board 2 has a plurality of disc operation buttons 7a to 7f disposed in a row along its lower end. The operating board 2 further has a cassette ejection button 8a disposed in the left side of the cassette insertion slot 6 and an FF button 8b for fast tape feeding and REW button 8c for tape rewinding are disposed on the right side of the cassette insertion slot 6. The operating board 2 further has a display 9 disposed adjacent its left end and below the disc insertion slot 4.

Figure 2:
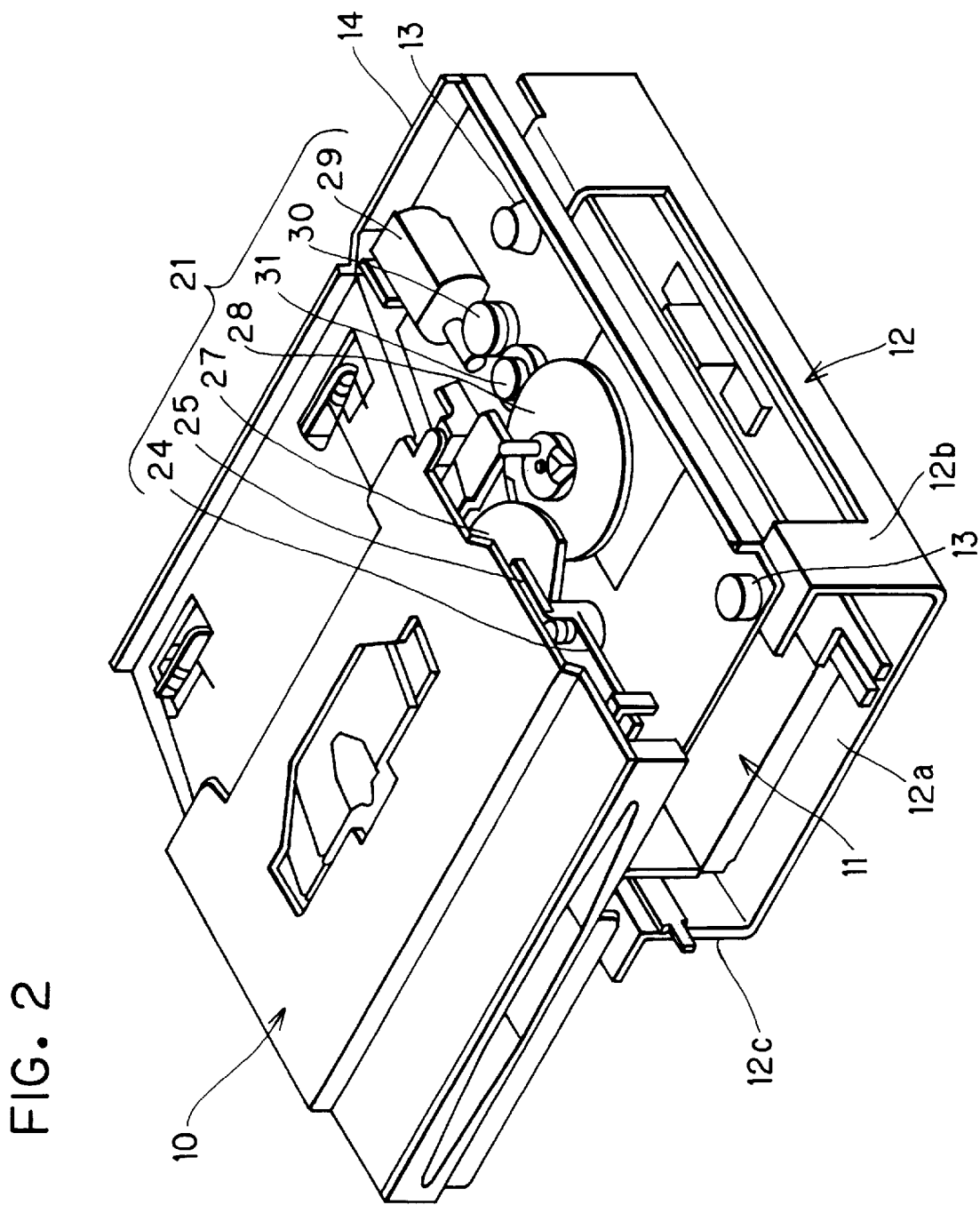
FIG. 2 is a perspective view showing the same embodiment with a cabinet removed.
Figure 3:
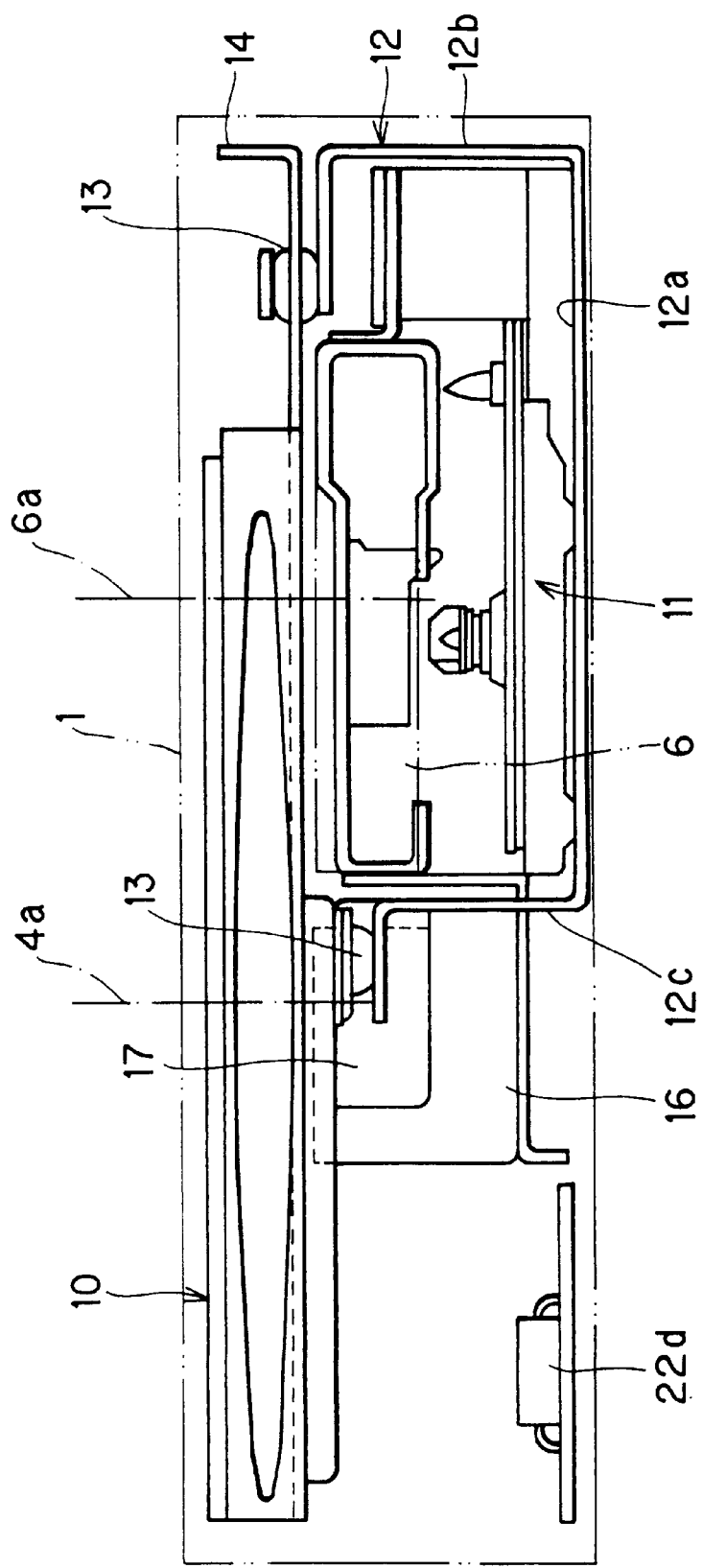
FIG. 3 is a front view showing the same embodiment with the cabinet removed.
Figure 5:
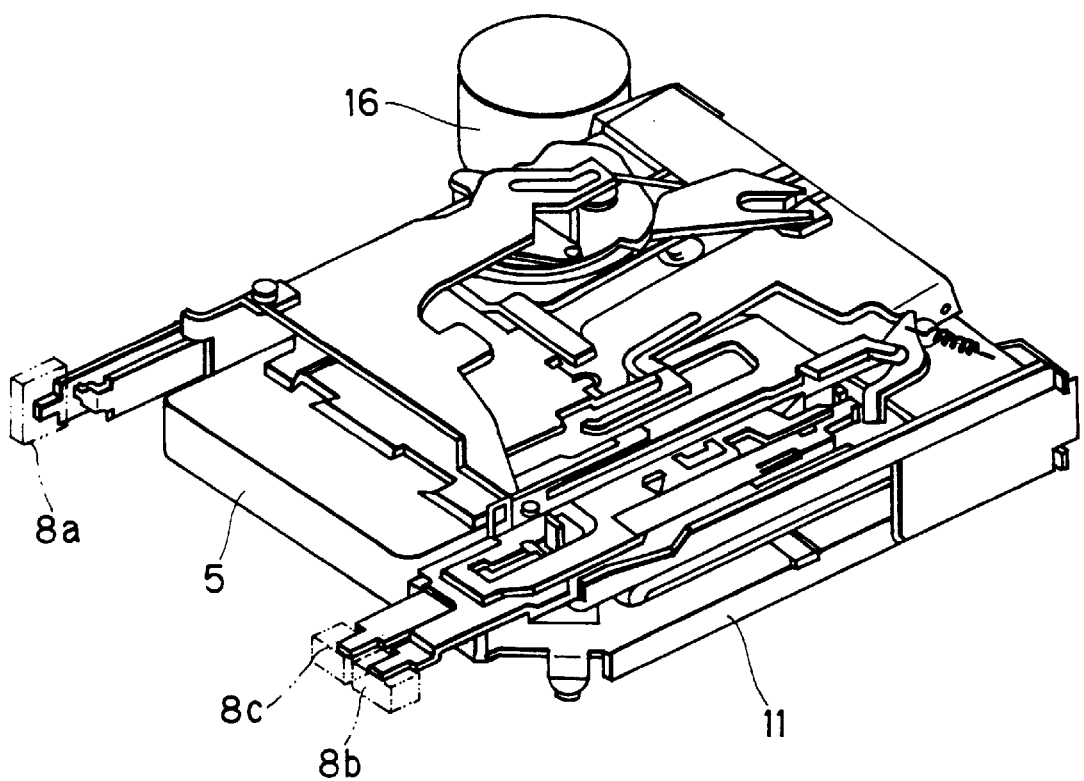
FIG. 5 is a perspective view showing a tape player in the same embodiment.

FIGS. 2 to 4 illustrate the position relation of a disc player 10 and a tape player 11 assembled in the cabinet 1 to each other. FIG. 2 is a perspective view showing the embodiment with the cabinet 1 removed, FIG. 3 is a front view showing the same, and FIG. 4 is a plan view showing the same. The tape player 11 which is shown in FIG. 5 is assembled in a lower chassis 12 having a bottom 12a an a left and a right side wall 12b and 12c. The lower chassis 12a is secured to the cabinet 1. An upper chassis 14 is mounted in a floating fashion via cushioning rubber members 13 and compression springs (not shown) in the left and right side walls 12b and 12c of the lower chassis 12. The disc player 10 is mounted on the upper chassis 14. The upper chassis 14 extends greatly leftwardly from the lower chassis 12, and the disc player 10 is located at a position greatly shifted leftwardly from the tape player 11.

Referring to FIG. 3, reference numeral 16 designates a the drive motor of the tape player 11. The motor 16 is disposed vertically in the cabinet 1. Ahead of the motor 16, a disc drive motor 17 of the disc player 11 is disposed vertically in the cabinet 1, and a turntable 18 is directly coupled to the shaft of the disc drive motor 17. The tape drive motor 16 has a greater axial dimension, i.e., vertical dimension, than the disc drive motor 17. The tape drive motor 17 has its top surface mounted on the bottom surface of the upper chassis 14, and the tape drive motor 16 is mounted such that its top surface is in the proximity of the bottom surface of the upper chassis 14. The two motors 16 and 17 thus have their top surfaces located substantially at the same level. The cassette insertion slot 6 is disposed at a position between the top and bottom surfaces of the tape drive motor 16. Furthermore, as is seen from the plan view of FIG. 4, the line 19 connecting the width center 4a of the disc insertion slot 4 and the center of the disc drive motor 17 extends in a direction coincident with the direction of the disc insertion, i.e., the longitudinal direction of the cabinet 1.

In FIG. 4, reference numeral 20 designates a pick-up for playing back data recorded on a disc. A movement zone of the pick-up 20 is set between the disc drive motor 17 and the left front corner of the cabinet 1 close to the disc insertion slot 4. The pick-up 20 is thus moved in oblique directions relative to the direction of the disc insertion.

Although not shown, a pick-up drive including a motor for driving the pick-up 20 is disposed in the zone noted above.

As shown in FIG. 3, with the disc player 10 disposed greatly leftwardly of the tape player 11, a space is defined in the cabinet 1 above the tape player 11 on the right side of the disc player 10. In addition, a space is also defined beneath the disc player 10 on the left side of the tape player 11. A further space is defined in a rear part of the cabinet 1.

A disc loading mechanism 21 is disposed in the space on the right side of the disc player 10. The disc loading mechanism 21 serves to transport the disc 3 inserted through the disc insertion slot 4 to a disc playing position in the disc player 10 and also transfer the disc 3 from the disc playing position toward the disc insertion slot 4, In the spaces on the left side of the tape player 11 and in the rear part of the cabinet 1, circuit components 22a to 22d are disposed.

Figure 6:
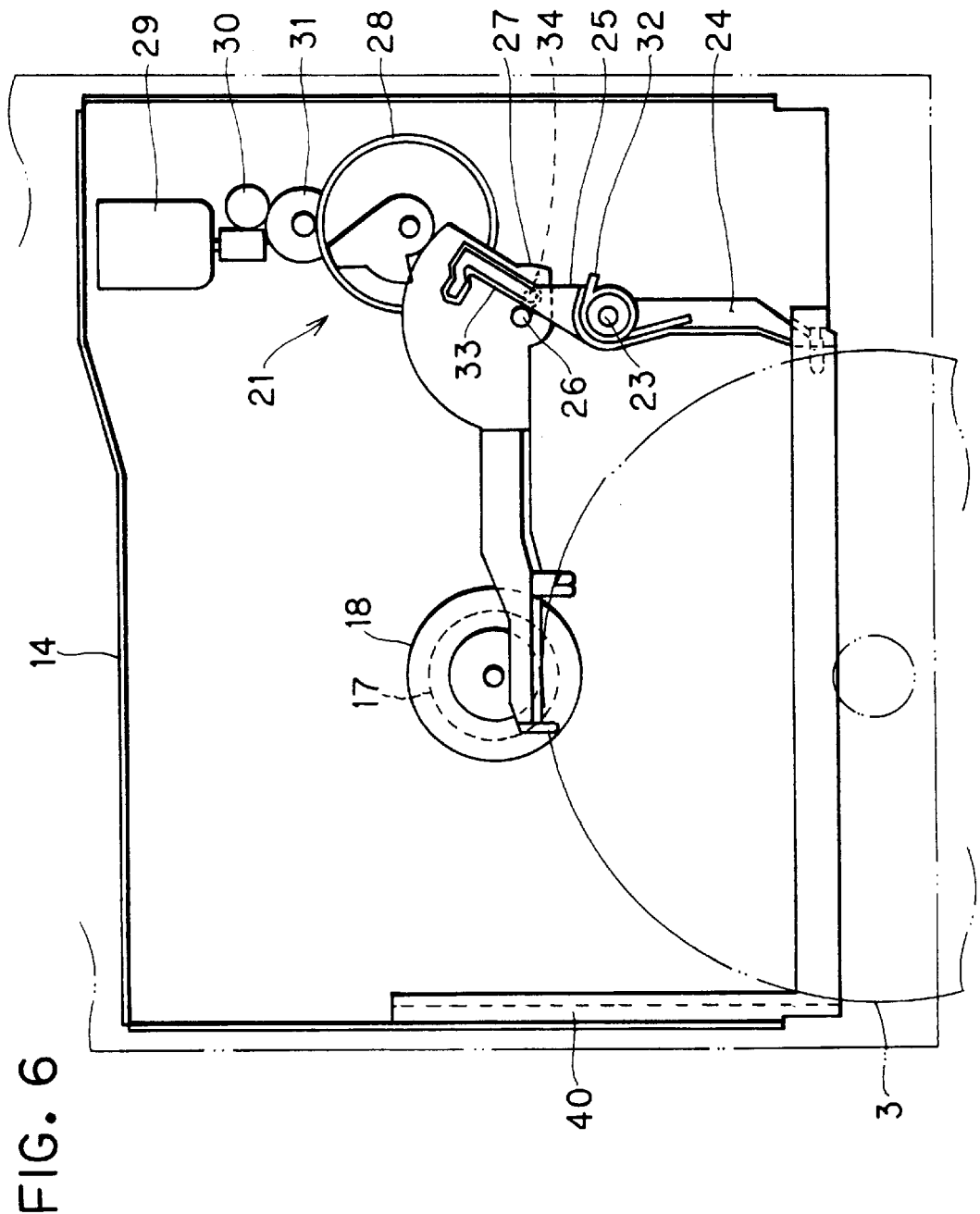
FIG. 6 is a plan view showing a disc loading mechanism in the same embodiment.
Figure 7:
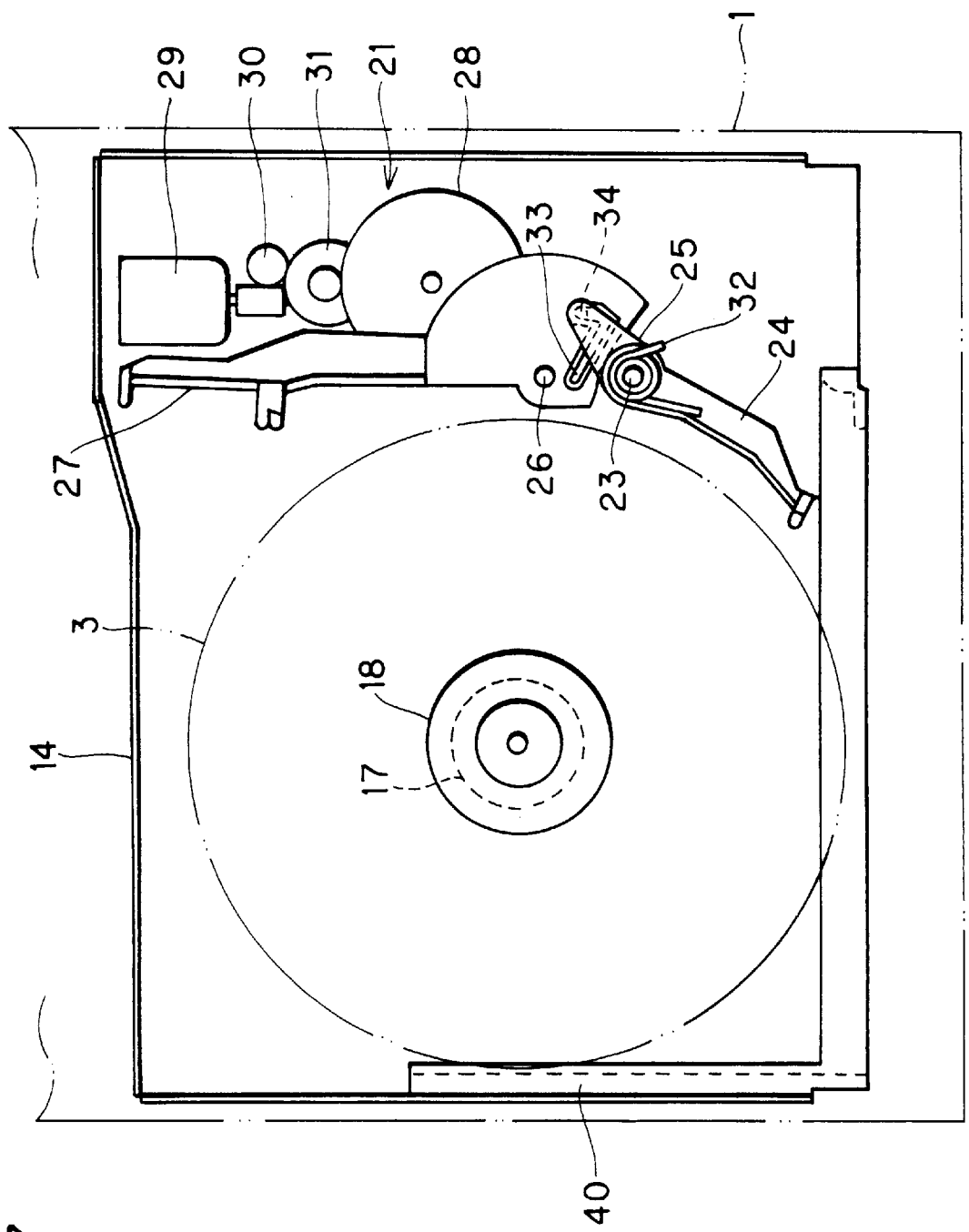
FIG. 7 is a plan view showing the disc loading mechanism in the same embodiment.

As shown in FIGS. 6 and 7, the disc loading mechanism 21 includes a push-forth member 24 and a coupling member 25, these members being rotatable about a shaft 23, a push-back member 27 rotatable about an another shaft 26, a rotor 28 for driving the push-back member 27, a loading motor 29, and speed reduction gears 30 and 31 for transmitting the torque of the motor 29 to the rotor 28. The push-forth member 24 and the coupling member 25 are made elastically integral by a spring 32. The push-back member 27 has a cam groove 33, and the coupling member 25 has a cam follower pin 34 engaged in the cam groove 33. The members 27 and 25 are operated in a revolving fashion in an interlocked relation to each other.

Figure 8:
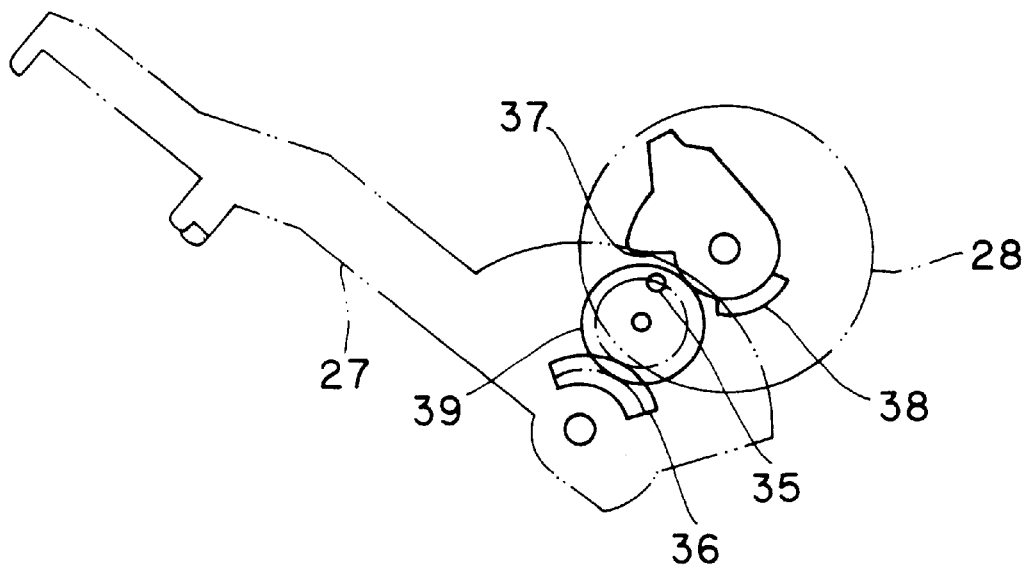
FIG. 8 is a plan showing part of the disc loading mechanism in the same embodiment.
Figure 9:
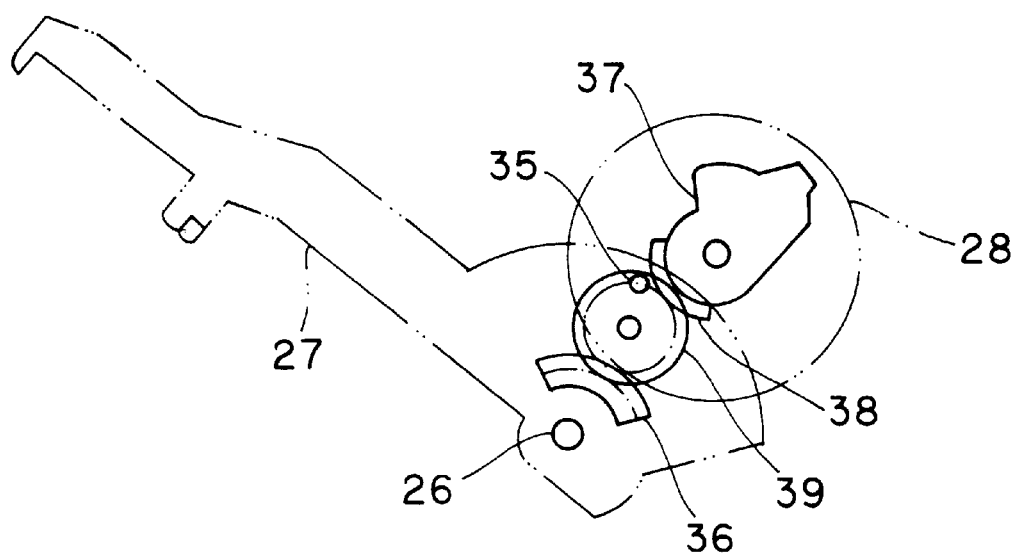
FIG. 9 is a plan view showing the same part of the disc loading mechanism in the same embodiment.

As shown in FIG. 8, the push-back member 27 has an engagement pin 35 and a gear portion 36. As shown in FIG. 9, the rotor 28 has a push portion 37 and a gear portion 38. An intermediate gear 39 is always in mesh with the gear portion 36 of the push-back member 27, and the gear portion 38 of the rotor 28 can be tentatively meshed with the intermediate gear 39. As shown in FIG. 7, a linear disc guide 40 is disposed leftwardly of the path of transport of the disc 3.

As shown in FIG. 6, when the disc 3 is inserted through the disc insertion slot 4, its edge comes to push the free end of the push-back member 27. When the push-back member 27 is thus caused to undergo a predetermined clockwise rocking movement, this rocking movement is detected, whereupon the motor 29 is started to cause counterclockwise rotation of the rotor 28.

While the rotor 28 undergoes one half rotation, its push portion 37 pushes the engagement pin 35, thus causing a great clockwise rocking movement of the push-back member 27. During this time, the push-forth member 24 undergoes a clockwise rocking movement in an interlocked relation to the push-back member 27, and pushes the edge of the disc 3 with its free end. The disc 3 is thus transported with its edge in contact with the disc guide 40 up to the disc playing position. After the reaching of the disc playing position by the disc 3, the push-back member 27 undergoes further clockwise rocking movement and is separated from the disc 3. At this time, the engagement between the cam groove 33 and the cam pin 34 has an effect of causing the push-forth member 24 to undergo a slight counterclockwise revolution and be separated from the disc 3, thus bringing about a state as shown in FIG. 7. When the rotor 28 has been rotated by about one half rotation, the motor 29 is tentatively stopped.

Right before the stopping of the motor 29, a damper (not shown) is lowered and holds the disc 3 while centering the disc 3 on the turntable 18. As a result of this centering, the disc 3 is separated from the disc guide 40. When it is intended to irrationally pull out the disc 3 being transported, the push-back member 24 is caused to undergo a counterclockwise rocking movement by causing flexing of the spring 32. The disc 3 thus can be taken out without causing any damage to mechanism parts.

For unloading the disc 3 form the disc playing position to the outside, the loading motor 29 is started again. When the motor 29 is started, the rotor 28 is again rotated in the counterclockwise direction. At this time, the damper (not shown) is immediately raised to release the disc 3 from the turntable 18. Subsequently, the gear portion 38 of the rotor 28 this time is brought into mesh with the intermediate gear 39, and drives the push-back member 27 in the counterclockwise direction. Meanwhile, the push-forth member 24 is once caused to be rocked in the clockwise direction to approach the disc 3, and is subsequently turns to be rocked in the counterclockwise direction. The disc 3 is pushed back by the push-back member 27 get out to the outside through the disc insertion slot 4, and now it can be taken out by holding it with a hand. When the motor 28 has been rotated one half rotation, the motor 29 is stopped, thus restoring the state as shown in FIG. 6.

With the construction as described above, the following effects are obtainable.

With the width direction center 4a of the disc insertion slot 4 set at a position shifted leftwardly from the width center 6a of the tape insertion slot 6 and also with the top surfaces of the disc drive motor 17 and tape drive motor 16 set substantially at the same level, the disc player 10 can be disposed at a level lower than the level of the tape player 11 by an extent corresponding to at least the axial dimension of the disc drive motor 17 in the vertical direction, and it is thus possible to make the height size of the overall player to be less than the sum of the height sizes of the disc player 10 and the tape player 11.

Since the accommodation spaces for accommodating the compact tape cassette 5 and the disc 3, respectively, can be defined one above another, the overall planar dimensions of the player can be made less than the sums of the planar dimensions of the individual component players.

With the cassette insertion slot 6 set to be at a level below and above the top and bottom surfaces, respectively, of the tape drive motor 16, the overall height size of the player can be reduced by an extent corresponding to at least the height dimension of the cassette accommodation space.

With the disc loading mechanism 21 disposed in the space, which is above the tape player 11 and on the right side of the disc player 10 in the cabinet 1, and also with the circuit components 22a to 22d disposed in the space, which is below the disc player 10 and on the left side of the tape player 11, and also in the space in a rear part of the cabinet 1, it is possible to make effective use of the space in the cabinet such as to obtain further overall size reduction of the player. It is thus possible to provide a car-mounted disc/tape player conforming to the DIN Standard, i.e., the width of 180 millimeters, the height of 52 millimeters and the depth of 170 millimeters, and additionally provide a radio receiver function.

The first embodiments of the invention as described above are by no means limitative. For example, while in the above first embodiment the top surfaces of the tape and disc drive motors 16 and 17 were set to be at the same level, it is only needed to set the bottom surface of the disc drive motor 17 to be at a level lower than the top surface level of the tape drive motor 16. Doing so permits corresponding overall size reduction of the player. The construction of the disc loading mechanism is not limited to that described above, and can be variously modified.

As another example, the tape player 11 may have both the playing and recording functions, and may be adapted to record the sound played back by the disc player 10.

Figure 10:
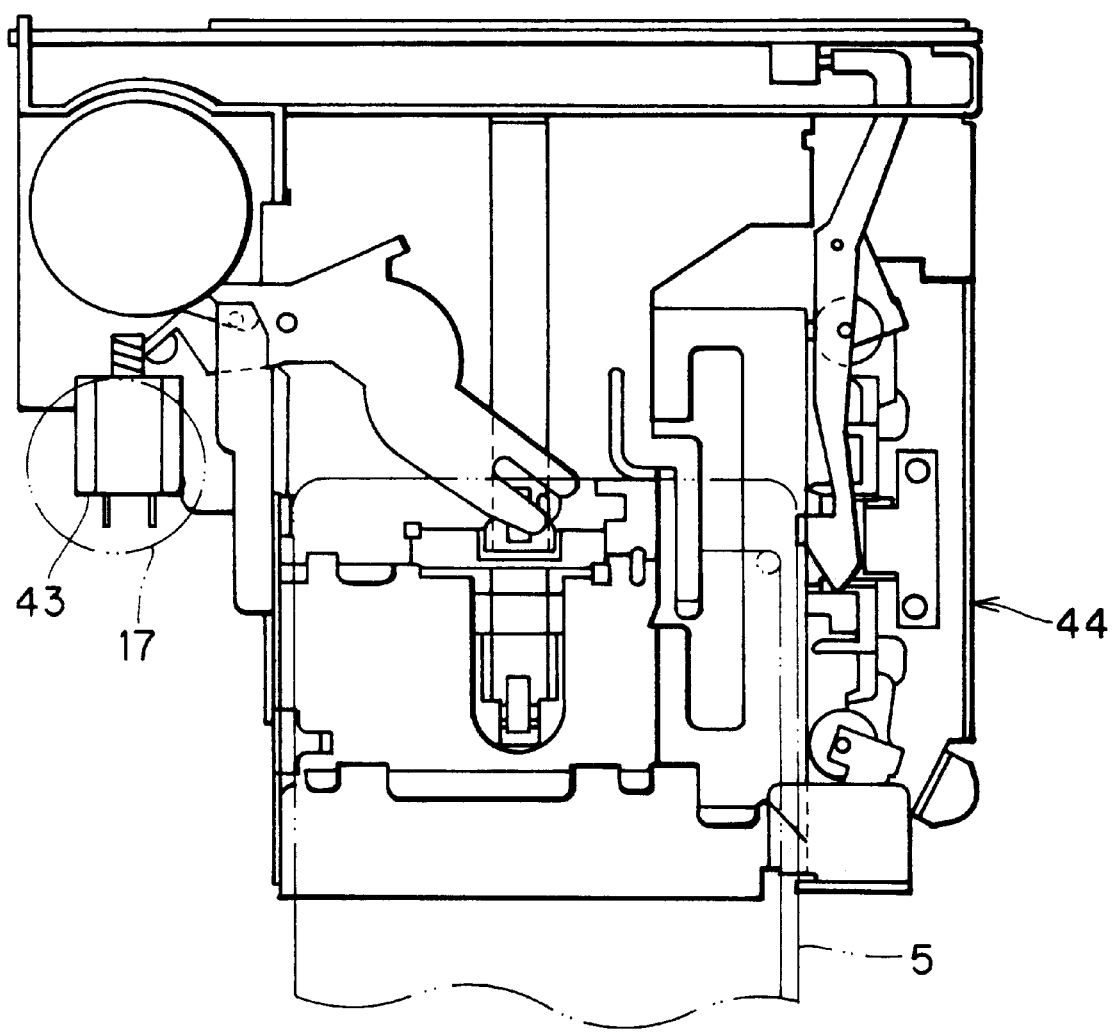
FIG. 10 is a plan view showing a tape player in a second embodiment of the invention.

As a further example, while the push button type tape player was exemplified in the above embodiments, it is possible to provide a car-mounted disc/tape player as shown in FIG. 10, which is a second embodiment of the invention. This embodiment adopts a tape player 44 of a motor loading type using a cassette loading motor 43. In this case, the cassette loading motor 43 is suitably disposed horizontally in a space below the disc drive motor 17.

Figure 11:
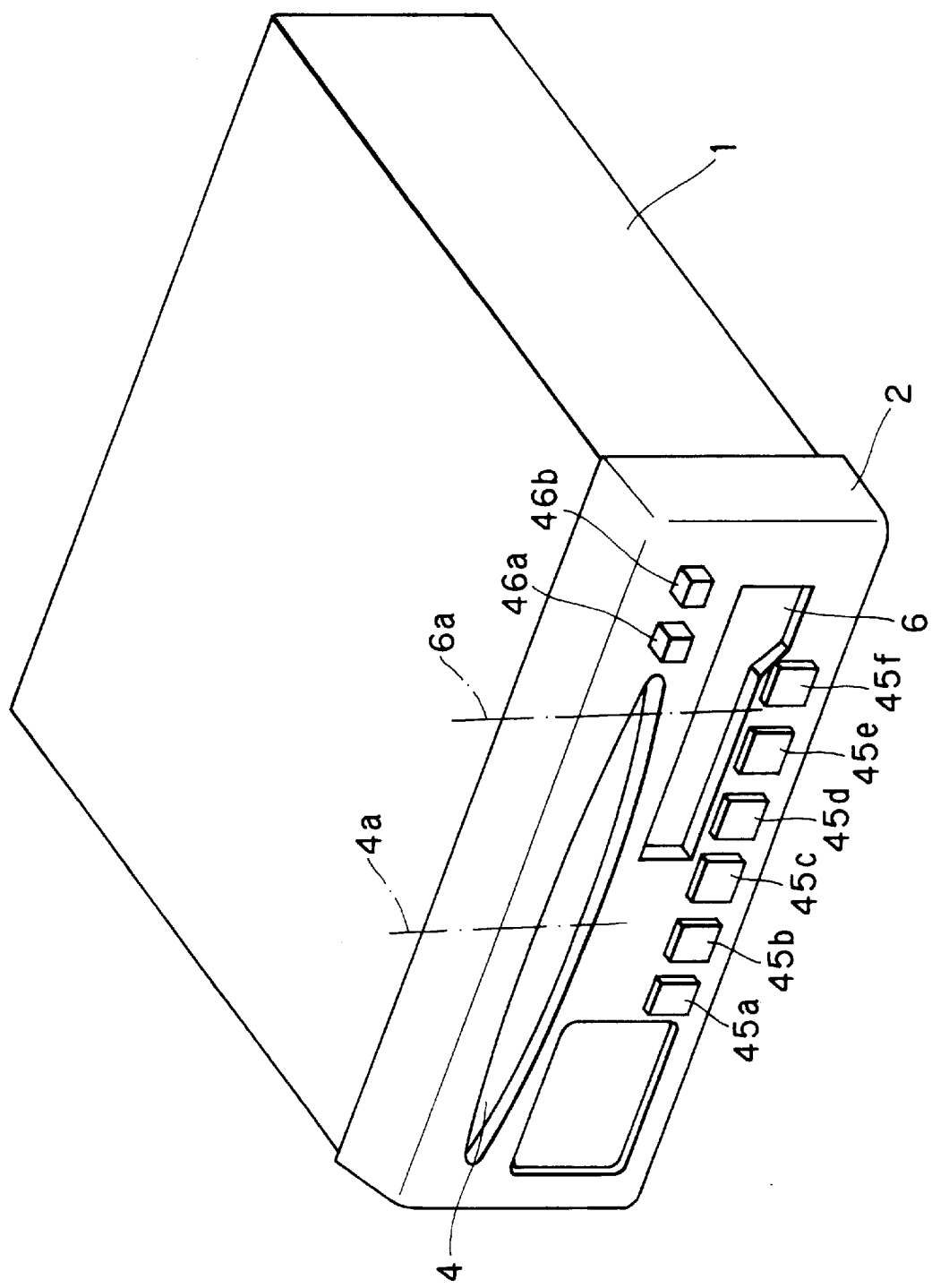
FIG. 11 is a perspective view showing the same second embodiment.

As shown, the front operating board 2 of the cabinet 1 has a plurality of operation buttons 45a and 45f disposed in a row extending along the lower end for the disc operation and tape operation. FIG. 11 is a perspective view showing the car-mounted disc/tape player using the motor loading type tape player 44, and also has a disc ejection button 46a and a cassette ejection button 46b both disposed on the right side of the disc insertion slot 4. With the second embodiment as shown in FIGS. 10 and 11, it is possible obtain the same effects as the first embodiment.

Although in the first embodiment the disc player 10 was mounted in a floating fashion via the cushioning rubber members 13 and compression springs (not shown) on the upper chassis 14, for obtaining more improved vibration-proof properties, suitably a vibration-proof circuit for electrically improving the vibration-proof properties of the pick-up may also be used. In this case, the floating stroke of the disc player 10 can be reduced, thus permitting corresponding overall player height size reduction.

The above first and second embodiments of the invention are by no means limitative, and various changes and modifications are possible.

As has been described in the foregoing, according to the invention with the disc and tape insertion slots set at positions horizontally shifted form one another and also with the bottom surface of the disc drive motor set at a level below the top surface level of the tape drive motor, it is possible to obtain overall player height size reduction.

In addition, with the compact tape cassette accommodation space disposed below the disc accommodation space, it is possible to obtain overall player height size reduction in view of the planer dimensions as well.

Furthermore, with the top surfaces of the disc and tape drive motors set to be at the same level, unit is possible to obtain further overall payer height size reduction.

Still further, with the cassette insertion slot set to be at a level between the top and bottom surface levels of the tape drive motor, the height dimension of the cassette accommodation space is covered by the height dimension of the tape drive motor, thus permitting further overall layer height size reduction.

Moreover, with the disc loading mechanism disposed in the space, which is above the tape player and on the right side of the disc player in the cabinet, and also with the circuit components disposed into the space, which is below the disc player and on the left side of the tape player, and also in the space in a rear part of the cabinet, it is possible to obtain more effective utilization of the cabinet space and provide a car-mounted disc/tape player, which permits readier overall size reduction for conforming to the DIN Standard.

What is claimed is:

1. A car-mounted disc/tape player comprising a disc player including a pick-up for playing back data recorded on a disc and a disc drive motor for rotating the disc, a tape player for playing back data recorded on a tape in a compact tape cassette and including a tape drive motor having a greater axial dimension than the disc drive motor, and a cabinet having a substantially rectangular shape capable of being accommodated in a predetermined accommodation space in a car, the disc player and the tape player being assembled in the cabinet;

said cabinet having a front operation board having a disc insertion slot for inserting the disc with the recording surface thereof down into the disc player and a cassette insertion slot for inserting the compact tape cassette with the tape surface thereof directed to the right, viewing toward the operating board, into the tape player;

said disc insertion slot and the cassette insertion slot being disposed one above another with a width center of the disc insertion slot in the width thereof set to a position leftwardly of a width center of the cassette insertion slot in the width thereof in the operating board, viewing toward the operating board, and with the disc insertion slot set at an upper position than that of the cassette insertion slot;

said disc drive motor being disposed forwardly of the tape drive motor and with its bottom surface set to a level below the top surface of the tape drive motor; and the direction of a line connecting the width center of the disc insertion slot and the center of the disc drive motor being set to be coincident with the direction of the disc insertion.

2. The car-mounted disc/tape player according to claim 1, wherein the top surfaces of the tape and disc drive motors are set to be at to the same height level.

3. The car-mounted disc/tape player according to claim 1, wherein the cassette insertion slot is set to be between the height levels of the top and bottom surfaces of the tape drive motor.

4. The car-mounted disc/tape player according to claim 1, further comprising a disc loading mechanism for transporting the disc inserted through the disc insertion slot to a disc playing position, said disc loading mechanism being disposed in a space defined above the tape player and rightwardly of the disc player in the cabinet, viewing toward the operating board, and further comprising electronic circuit components disposed in a space defined below the disc player and leftwardly of the tape player in the cabinet, viewing toward the operating board, and also in a space in a rear part of the cabinet.

5. The car-mounted disc/tape player according to claim 1, wherein a left corner zone defined between the disc drive motor and the left corner of the cabinet and close to the disc insertion slot in the cabinet constitutes a pick-up movement zone and also as a zone for disposing a pick-up drive means.

* * * * *